(12) United States Patent
Funayama et al.

(10) Patent No.: US 9,305,220 B2
(45) Date of Patent: Apr. 5, 2016

(54) SPECTRUM MEASUREMENT DEVICE

(75) Inventors: Ryuji Funayama, Yokohama (JP);
Shinya Kawamata, Gotemba (JP);
Yumiko Yoshikawa, Tokyo (JP);
Tsutomu Ishi, Tokyo (JP)

(73) Assignees: TOYOTA JIDOSHA KABUSHIKI KAISHA, Toyota-shi (JP); NEC CORPORATION, Tokyo (JP)

( * ) Notice: Subject to any disclaimer, the term of this patent is extended or adjusted under 35 U.S.C. 154(b) by 282 days.

(21) Appl. No.: 13/639,378

(22) PCT Filed: Apr. 8, 2011

(86) PCT No.: PCT/JP2011/058903
§ 371 (c)(1),
(2), (4) Date: Oct. 4, 2012

(87) PCT Pub. No.: WO2011/126111
PCT Pub. Date: Oct. 13, 2011

(65) Prior Publication Data
US 2013/0038857 A1 Feb. 14, 2013

(30) Foreign Application Priority Data
Apr. 9, 2010 (JP) .................................. 2010-090878

(51) Int. Cl.
*G01C 3/08* (2006.01)
*G06K 9/00* (2006.01)
(Continued)

(52) U.S. Cl.
CPC ........... *G06K 9/00805* (2013.01); *G01S 17/936* (2013.01); *G06K 9/2018* (2013.01); *G08G 1/165* (2013.01); *G08G 1/166* (2013.01)

(58) Field of Classification Search
CPC ............. G01S 17/936; G06K 9/00805; G06K 9/2018; G08G 1/166; G08G 1/165

USPC ........... 356/4.07, 326, 402; 701/36; 340/904, 340/901
See application file for complete search history.

(56) References Cited

U.S. PATENT DOCUMENTS 4,447,800 A * 5/1984 Kasuya et al. ................ 340/904
4,947,044 A * 8/1990 Pinson .......................... 250/330
(Continued)

FOREIGN PATENT DOCUMENTS

EP 0 898 148 A2 2/1999
EP 1 718 068 A2 11/2006
(Continued)

OTHER PUBLICATIONS

Manolakis et al. "Hyperspectral Image Processing for Automatic Target Detection Applications", Lincoln Laboratory Journal, 2003.*
(Continued)

*Primary Examiner* — Luke Ratcliffe
*Assistant Examiner* — Assres H Woldemaryam
(74) *Attorney, Agent, or Firm* — Oblon, McClelland, Maier & Neustadt, L.L.P.

(57) ABSTRACT

A spectrum measurement device that recognizes objects to be measured on the basis of spectral data of observed light that is detected by a spectrum sensor capable of measuring wavelength information and light intensity information. The spectrum measurement device comprises a lighting device capable of projecting light that includes a wavelength region with a high atmospheric absorption index and recognizes the distance from a vehicle to an object to be measured through a computation that uses spectral data of observed light that is obtained from the object to be measured whereupon light of at least the wavelength region with the high atmospheric absorption index is projected.

15 Claims, 15 Drawing Sheets

(51) Int. Cl.
*G01S 17/93* (2006.01)
*G06K 9/20* (2006.01)
*G08G 1/16* (2006.01)

(56) References Cited

U.S. PATENT DOCUMENTS

| | | | |
|---|---|---|---|
| 5,214,408 A * | 5/1993 | Asayama | 340/435 |
| 5,347,475 A | 9/1994 | Taylor et al. | |
| 6,919,565 B2 | 7/2005 | Seto | |
| 6,999,024 B2 | 2/2006 | Kumon et al. | |
| 2001/0043330 A1 * | 11/2001 | Jung et al. | 356/419 |
| 2003/0173517 A1 * | 9/2003 | Seto | 250/330 |
| 2004/0065834 A1 * | 4/2004 | Stone et al. | 250/341.8 |
| 2007/0058776 A1 | 3/2007 | Kataoka et al. | |
| 2007/0246652 A1 | 10/2007 | Gopalsami et al. | |
| 2009/0050807 A1 | 2/2009 | Ota et al. | |
| 2009/0073423 A1 * | 3/2009 | Jung et al. | 356/73 |
| 2009/0326383 A1 * | 12/2009 | Barnes et al. | 600/476 |
| 2010/0043706 A1 * | 2/2010 | Jung et al. | 118/712 |
| 2012/0113412 A1 | 5/2012 | Kawamata et al. | |
| 2012/0123637 A1 | 5/2012 | Funayama et al. | |

FOREIGN PATENT DOCUMENTS

| | | |
|---|---|---|
| GB | 2 081 547 A | 2/1982 |
| JP | 57-29876 U | 2/1982 |
| JP | 7 280724 | 10/1995 |
| JP | 9 172649 | 6/1997 |
| JP | 2000 251052 | 9/2000 |
| JP | 2003 270036 | 9/2003 |
| JP | 2004 191131 | 7/2004 |
| JP | 2005 121601 | 5/2005 |
| JP | 2005 202670 | 7/2005 |
| JP | 2006 14315 | 1/2006 |
| JP | 2006 121617 | 5/2006 |
| JP | 2006 145362 | 6/2006 |
| JP | 2006 242909 | 9/2006 |
| JP | 2007 93306 | 4/2007 |
| JP | 2008 002817 | 1/2008 |
| JP | 2008 27242 | 2/2008 |
| JP | 2008 252173 | 10/2008 |
| JP | 2008 275477 | 11/2008 |
| JP | 2009 55107 | 3/2009 |
| JP | 2009 115498 | 5/2009 |
| JP | 2009 201064 | 9/2009 |
| WO | WO 2010/137172 A1 | 12/2010 |
| WO | WO 2010/137174 A1 | 12/2010 |

OTHER PUBLICATIONS

Extended Search Report issued Jun. 7, 2013 in European Application No. 11766011.8
International Search Report Issued Jul. 5, 2011 in PCT/JP11/58903 Filed Apr. 8, 2011.
U.S. Appl. No. 13/639,363, filed Oct. 4, 2012, Kawamata, et al.
International Preliminary Report on Patentability issued Nov. 6, 2012, in PCT/JP2011/058903, filed Apr. 8, 2011.
Translation of the Written Opinion issued Jul. 5, 2011, in PCT/JP2011/058903, filed Apr. 8, 2011.
Office Action mailed May 15, 2015, in co-pending U.S. Appl. No. 13/639,363.
European Search Report dated Apr. 15, 2015, in European Patent Application No. 11 76 6012.
Notice of Allowance dated Sep. 30, 2015, in related U.S. Appl. No. 13/639,363.

* cited by examiner

Fig.7

| Wavelength (nm) | Reflectance Coefficient |
|---|---|
| 400 | 19 |
| 405 | 0 |
| 410 | 22 |
| 415 | 45 |
| 420 | 77 |
| ⋮ | ⋮ |
| 500 | 255 |
| 505 | 255 |
| ⋮ | ⋮ |
| 700 | 88 |
| 705 | 113 |
| 710 | 97 |
| ⋮ | ⋮ |
| 990 | 3 |
| 995 | 0 |
| 1000 | 5 |

SPECTRUM MEASUREMENT DEVICE

FIELD OF THE INVENTION

The present invention relates to a spectrum measurement device that recognizes a measurement target from a set of spectral data on the measurement target measured by a spectral sensor.

BACKGROUND OF THE INVENTION

Some vehicles such as automobiles in recent years include a drive assist system mounted thereon that recognizes the dynamically changing situation around the vehicle including pedestrians and traffic lights so as to assist the driver to drive the vehicle or to make decisions. Most of such drive assist systems take an image of a traffic light or a pedestrian with a CCD camera or the like, recognize the condition of the traffic light or pedestrian through image processing of the taken image, and use the recognized results in assisting the drive as mentioned above. However, a pedestrian typically varies numerously in shape depending on the size, orientation, or presence or absence of an object being carried therewith, so that it is difficult to accurately recognize the presence of a pedestrian from the shape obtained based on the image processing. Although traffic lights generally have standardized sizes and colors, they may appear differently depending on the viewing angle, so that it is difficult to accurately recognize presence of a traffic light from the shape obtained based on the image processing.

Patent Document 1 describes a remote sensing technique for recognizing a measurement target using spectral data collected using a spectral sensor. According to Patent Document 1, measurement targets that are hard to recognize in a visible light region only, such as forest, field, or town, are classified and sorted according to characteristics, using multispectral image data including visible and invisible light regions taken by a spectral sensor mounted on an airplane or satellite, so that the measurement targets are recognized based on the data that is classified and sorted according to characteristics.

With the spectral sensor, brightness (light intensity) of each wavelength is observed so that the characteristics specific to a measurement target are known by comparing the brightnesses of various wavelengths, which enables identification of the measurement target. Patent Document 2 describes such a spectral sensor put into practical use as a hyperspectral sensor having wide bandwidth imaging capability and a high resolution power of several nm to several tens nm.

Application of such a spectral sensor in vehicles such as automobiles is considered recently, for recognizing various measurement targets in the vicinity of the vehicle using spectral data taken by the spectral sensor mounted on the vehicle.

PRIOR ART DOCUMENT

Patent Document

Patent Document 1: Japanese Laid-Open Patent Publication No. 2000-251052
Patent Document 2: Japanese Laid-Open Patent Publication No. 2006-145362

SUMMARY OF THE INVENTION

When recognizing various measurement targets using such a spectral sensor, one issue is that the spectrum of the measurement target changes by the influence of ambient light such as sunlight. Even if spectral data on a measurement target can be obtained using the spectral sensor, a reduction in recognition accuracy by the influence of such ambient light is inevitable. Namely, the reduction in recognition accuracy due to the influence of ambient light deters an attempt to recognize various measurement targets in the vicinity of the vehicle using spectral data taken by the spectral sensor, and makes it difficult to recognize measurement targets, which is required particularly in assisting the drive of the vehicle.

An objective of the present invention is to provide a spectrum measurement device capable of recognizing a measurement target highly reliably with reduced influence of ambient light through measurement using a spectral sensor.

To achieve the foregoing objective, the present invention provides a spectrum measurement device for recognizing a measurement target based on a spectral data set of observed light detected by a spectral sensor capable of obtaining wavelength information and light intensity information. The spectrum measurement device includes a lighting device and a measurement target recognition unit. The lighting device irradiates light, including a wavelength band exhibiting a high atmospheric absorption coefficient, to the measurement target. The measurement target recognition unit recognizes the measurement target through an arithmetic operation using a spectral data set of light observed from the measurement target irradiated at least with the light including the wavelength band exhibiting a high atmospheric absorption coefficient.

The inventors have ascertained that the distribution of ambient light such as sunlight that largely influences the spectral data set of observed light shows a decrease in intensity in a wavelength band exhibiting a high atmospheric absorption coefficient. That is, the spectral data set of the measurement target observed when it is irradiated with light including a wavelength band exhibiting a high atmospheric absorption coefficient from the lighting device is affected a little by ambient light that is typically sunlight. In the present invention, the measurement target is recognized through an arithmetic operation using such a spectral data set, so that the influence of ambient light in recognizing measurement targets such as people, vehicles, animals, or plants is reduced. Whatever the measurement target is, the reliability of recognizing the measurement target, i.e., the distance thereto from the observation point, or a change in the relative distance between the target and the observation point, is improved. Moreover, there is no need to perform any calculation for correction such as removing the influence of ambient light from the observed spectral data set, so that the load for recognizing the measurement target is reduced, and the processing for the recognition of the measurement target can be made at higher speed.

In accordance with one aspect of the present invention, the measurement target recognition unit includes an identification unit identifying the measurement target based on the spectral data set of the observed light and determining a reflectance specific to the identified measurement target. The measurement target recognition unit recognizes a distance from an observation point of the spectral data set to the measurement target as a ratio of light output intensity of the lighting device based on the determined reflectance to light intensity of observed light detected by the spectral sensor.

The distance from the observation point of the spectral data to the measurement target can be determined, as long as the reflectance specific to the measurement target is known, as a value correlating to the ratio of light output intensity of the lighting device based on the reflectance to light intensity of observed light detected by the spectral sensor (received light intensity). Namely, the reflectance specific to the measurement target is previously determined, so that the distance from the observation point to the measurement target can be recognized based on how much the intensity of light observed from the measurement target is lower by attenuation than the output intensity of light irradiated to the measurement target. Since the recognition of distance is made based on the intensity of light observed by irradiating light that is a little affected by ambient light, the distance from the observation point to the measurement target can be recognized highly accurately with reduced influence of ambient light.

In accordance with another aspect of the present invention, the lighting device is configured to irradiate, to the measurement target, light of the wavelength band exhibiting a high atmospheric absorption coefficient as well as light of a wavelength band other than the wavelength band exhibiting a high atmospheric absorption coefficient. The identification unit includes a database having previously registered spectral data sets indicating spectral reflectances of a plurality of measurement targets. The identification unit identifies the measurement target through comparison of the spectral data set of the light observed by the spectral sensor when the measurement target is irradiated with the light of a wavelength band other than the wavelength band exhibiting a high atmospheric absorption coefficient with the plurality of spectral data sets registered in the database, and determining a reflectance specific to the measurement target. The light intensity of the observed light detected by the spectral sensor is a value obtained as intensity of light reflected by the measurement target when the light of a wavelength band exhibiting a high atmospheric absorption coefficient is being irradiated to the measurement target.

The spectral distribution shape or spectral intensity as the spectral data on light observed from the measurement target changes also depending on the properties of the measurement target such as its specific surface contour or the like. By using spectral data specific to each measurement target as the basis of recognition, what object the measurement target is can be determined more accurately. The surface contour specific to each measurement target affects the spectral data of observed light differently at various wavelengths of the observed light. In a wavelength band other than the wavelength band exhibiting a high atmospheric absorption coefficient, in particular, in a wavelength band exhibiting a low atmospheric absorption coefficient, the spectral data that reflects the properties of the measurement target is relatively less affected by the atmosphere. Therefore, the measurement target can be identified with higher accuracy by using light of a wavelength band other than the wavelength band exhibiting a high atmospheric absorption coefficient, for example, a wavelength band exhibiting a low atmospheric absorption coefficient, as the basis of identification, which in turn enables highly accurate determination of reflectance of the measurement target. For the light intensity of observed light detected by the spectral sensor, a value is used that is obtained as intensity of light reflected by the measurement target when the light of a wavelength band exhibiting a high atmospheric absorption coefficient is irradiated to the measurement target. Therefore the intensity of observed light can be calculated without any influence of ambient light as mentioned above. As a result, the distance from the observation point to the measurement target can be recognized with higher accuracy.

In accordance with another aspect of the present invention, the measurement target recognition unit calculates the distance L from the observation point of the spectral data set to the measurement target using the following expression $$L^4 = (PP/Pr) \times R \times k,$$

where R represents the reflectance determined by the identification unit, PP represents the light output intensity of the lighting device, Pr represents the light intensity of the observed light detected by the spectral sensor, and k represents a correction factor indicating a relationship between the light output intensity PP and the light intensity Pr.

The correction factor k is a coefficient indicating the relationship between the light output intensity PP of the lighting device and the light intensity Pr of observed light detected by the spectral sensor when the reflectance R and the distance L are both 1. The correction factor k is used for defining an absolute value of the light output intensity PP and an absolute value of the light intensity Pr at a predetermined distance.

In accordance with another aspect of the present invention, the measurement target recognition unit recognizes a change in relative distance between the observation point of the spectral data set and the measurement target through an arithmetic operation for determining a change over time of the spectral data set of the light observed from the measurement target irradiated with the light of a wavelength band exhibiting a high atmospheric absorption coefficient.

Changes over time of the spectral data such as the spectral light intensity or spectral distribution shape of light observed from the measurement target take place in accordance with the relative positional relationship (distance) between the measurement target and the observation point of the spectral data. Therefore, by using the changes over time of the spectral data observed through irradiation of light of a wavelength band exhibiting a high atmospheric absorption coefficient, in other words, a wavelength band less affected by ambient light, as the basis of recognition, the distance from the measurement target to the observation point of the spectral data, such as "approaching", "going away", or "staying (no change in relative distance)", can also be recognized correctly.

In accordance with another aspect of the present invention, the arithmetic operation for determining a change over time of the spectral data set is either a difference operation or a division operation on spectral data sets obtained at different points in time.

Taking the spectral light intensity as one example of a spectral data set that changes over time, the intensity of light projected by the lighting device and received by the target increases over time if the measurement target is approaching the observation point of the spectral data set. On the other hand, the intensity of light projected by the lighting device and received by the target decreases over time if the measurement target is going away from the observation point of the spectral data set. The intensity of light projected by the lighting device and received by the target stays constant over time when there is no change in relative distance between the measurement target and the spectral data set observation point. Such changes over time of a spectral data set can be determined through simple calculation such as a difference operation or a division operation on the spectral data set obtained at various different points in time, as in the configuration described above.

In accordance with another aspect of the present invention, the measurement target recognition unit includes an identification unit identifying the measurement target based on the spectral data set of the observed light detected by the spectral sensor.

This way, a change in relative distance to the measurement target can be recognized at the same time with the recognition of what object this measurement target is, i.e., identification of the measurement target.

In accordance with another aspect of the present invention, when the measurement target is being irradiated with the light of a wavelength band exhibiting a high atmospheric absorption coefficient, the identification unit identifies the measurement target irradiated with the light based on a comparison between the spectral data set of the observed light detected by the spectral sensor and the spectral data sets on a plurality of measurement targets previously registered in a database.

Spectral data sets on measurement targets are specific to the respective types of measurement targets. Therefore, the measurement target can be identified as what it is easily by comparing the observed spectral data set with spectral data sets on a plurality of measurement targets previously registered in the database using, for example, a normalized correlation method or the like.

In accordance with another aspect of the present invention, the spectral sensor and the lighting device are both mounted on a vehicle. The measurement target to be recognized is an object present in the vicinity of the vehicle.

This way, various recognition information necessary in assisting the drive of the vehicle can be obtained correctly with minimum influence of ambient light.

BRIEF DESCRIPTION OF THE DRAWINGS

FIG. 7 is a diagram showing a table of reflectance of guard-rails as one example of spectral data registered for each measurement target in a spectral database;

DETAILED DESCRIPTION OF THE PREFERRED EMBODIMENTS

Figure 1:
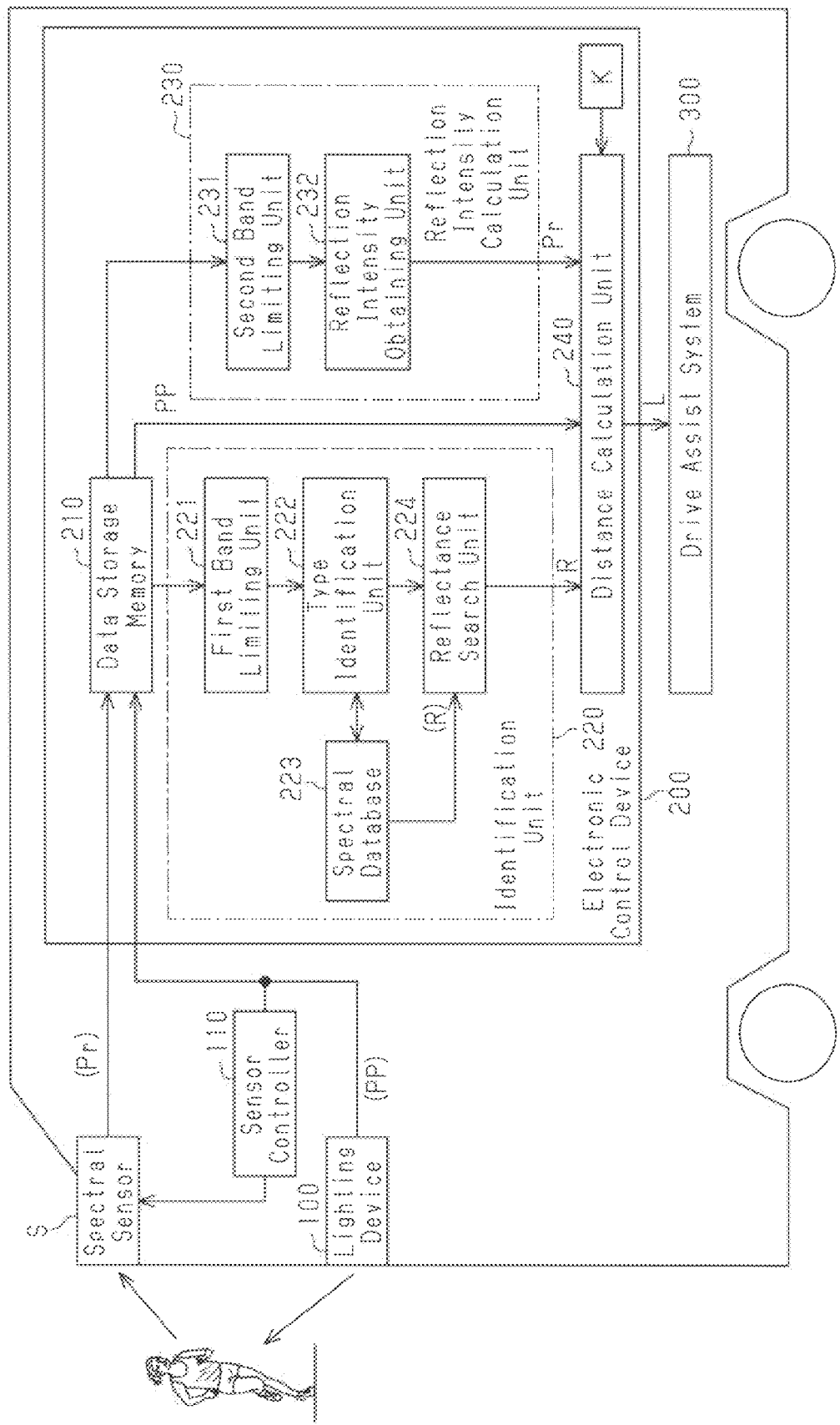
FIG. 1 is a block diagram illustrating the schematic configuration of a spectrum measurement device according to a first embodiment of the present invention.

FIG. 1 illustrates the schematic configuration of a spectrum measurement device according to a first embodiment of the present invention.

As shown in FIG. 1, the spectrum measurement device of this embodiment is mounted on a vehicle such as an automobile, for example, and includes a lighting device 100 capable of irradiating light of both wavelength bands having a high atmospheric absorption coefficient and a low atmospheric absorption coefficient to measurement targets that are objects such as pedestrians, traffic lights, or obstacles. The spectrum measurement device also includes a spectral sensor S for observation of spectral data on a measurement target irradiated by the lighting device 100. The spectrum measurement device further includes a sensor controller 110 that controls the light sensitivity or the like of the spectral sensor S. In this embodiment, the measurement target that is an object present in the vicinity of the vehicle is identified as one of the objects such as a human being, a guardrail, asphalt, or the like, and the distance between the identified measurement target and the vehicle is recognized, based on the spectral data measured by the spectral sensor S.

The spectral data on the measurement target observed by the spectral sensor S is usually affected by ambient light such as, in particular, sunlight. The recognition accuracy of measurement targets based on such spectral data is therefore lowered. In this embodiment, such influence of sunlight on the spectral data is minimized when a measurement target is recognized based on spectral data, more specifically, when the relative distance to the measurement target is recognized.

Figure 2:
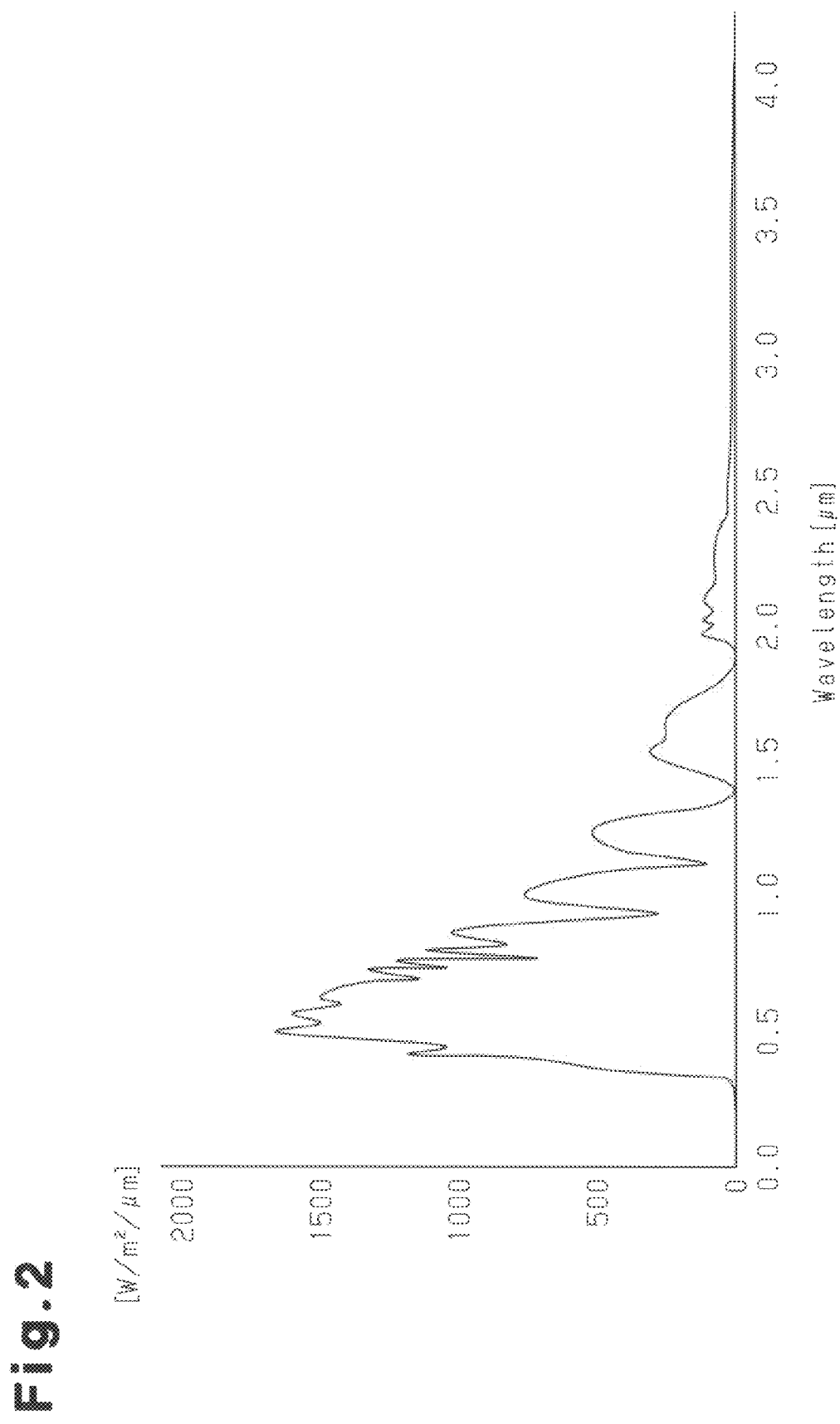
FIG. 2 is a graph showing one example of a spectral irradiance distribution of sunlight.

FIG. 2 shows a spectral irradiance distribution of sunlight observed by the spectral sensor S.

As shown in FIG. 2, the spectral data on sunlight observed by the spectral sensor S shows that light intensity varies at each wavelength of the spectrum. For example, in a wavelength band around 0.5 µm, the light intensity of sunlight observed by the spectral sensor S, i.e., the energy of solar irradiation per unit area, is about 1600 W/m$^2$/µm, which is very high. On the other hand, in wavelength bands, for example, around 0.93 µm, 1.1 µm, 1.4 µm, and 1.9 µm, the light intensity of sunlight, i.e., the energy of solar irradiation per unit area, is about 250 W/m$^2$/µm, about 100 W/m$^2$/µm, 0 W/m$^2$/µm, and 0 W/m$^2$/µm, respectively, which is very low as compared to the light intensity in the wavelength band around 0.5 µm. This is because the light components in these wavelength bands are absorbed by $H_2O$, $CO_2$, and the like as the sunlight passes through the atmosphere. Namely, it can be seen that the rate of light absorbed by the atmosphere, i.e., the atmospheric absorption coefficient, of the light in the wavelength band around 0.5 µm is low, while that of the light in the wavelength bands around 0.93 µm, 1.1 µm, 1.4 µm, and 1.9 µm is high. In this embodiment, therefore, the measurement targets are recognized utilizing such characteristics of the spectral irradiance distribution of sunlight as ambient light.

Figure 3:
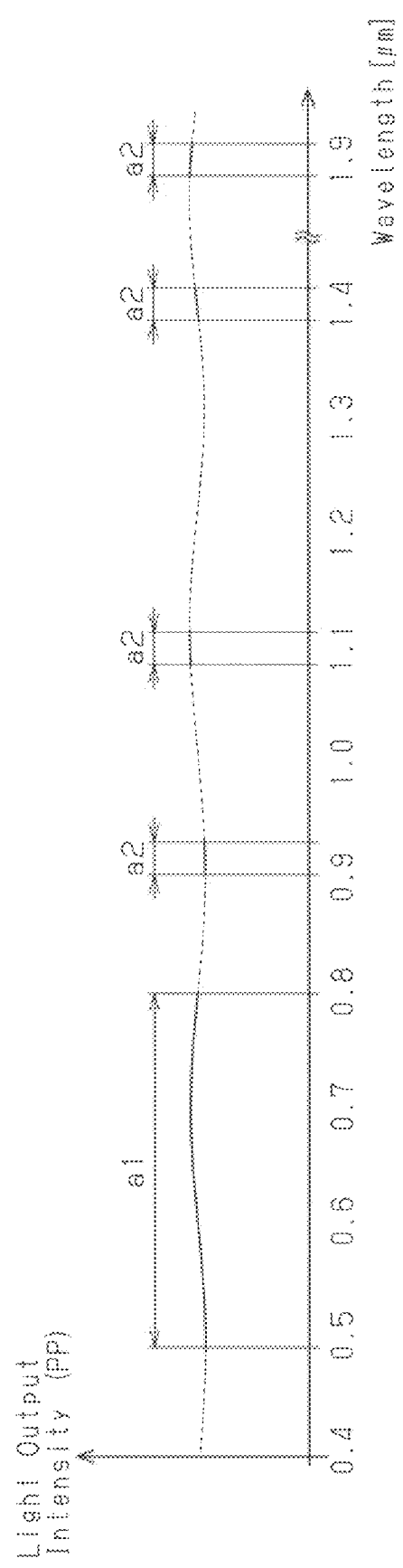
FIG. 3 is a graph showing one example of wavelength-output characteristics of light irradiated from a lighting device in the spectrum measurement device of FIG. 1.

In FIG. 3, a wavelength band from 0.5 µm to 0.8 µm is denoted as a regional as the wavelength band exhibiting a low atmospheric absorption coefficient. Wavelength bands around 0.93 µm, 1.1 µm, 1.4 µm, and 1.9 µm are each denoted as a region a2 as the wavelength band exhibiting a high atmospheric absorption coefficient. In this embodiment, the lighting device 100 is configured to irradiate light of wavelength bands including the regions a1 and a2. The intensity of light irradiated from the lighting device 100 is set higher than the light intensity of sunlight in the wavelength band exhibiting a high atmospheric absorption coefficient.

Spectral data on a measurement target when the lighting device 100 is emitting light thereto is measured by the spectral sensor S, and the measured spectral data is stored in a data storage memory 210 equipped in an electronic control device 200 (see FIG. 1) as 8-bit spectral information, for example. The electronic control device 200 functions as a measurement target recognition unit or a controller that recognizes the measurement target based on the spectral data measured by the spectral sensor S. The lighting device 100 irradiates light to measurement targets and the spectral data on the measurement targets is measured all the time, and the measured spectral data is progressively stored in the data storage memory 210. The data storage memory 210 also stores the light output intensity PP of the lighting device 100, which is determined based on the electric current supplied to the lighting device 100.

The spectral data on measurement targets progressively stored in the data storage memory 210 is then received by an identification unit 220, which recognizes (identifies) an object being measured as one of a human being, a vehicle, an animal, a plant, or an obstacle such as an a guardrail or a pole.

The spectral data on measurement targets received by the identification unit 220 is output to a first band limiting unit 221, which extracts only part of spectral data in a wavelength band that is less affected by atmospheric absorption caused by $H_2O$, $CO_2$ or the like, i.e., the wavelength band from 0.5 μm to 0.8 μm with a low atmospheric absorption coefficient. The spectral data on the wavelength band exhibiting a low atmospheric absorption coefficient extracted by the first band limiting unit 221 is received by a type identification unit 222, which identifies the type of the object that is the target of measurement. The type identification unit 222 looks up a spectral database 223 in which sets of spectral data on a plurality of types are registered in advance to be compared with the spectral data measured by the spectral sensor S.

Figure 4:
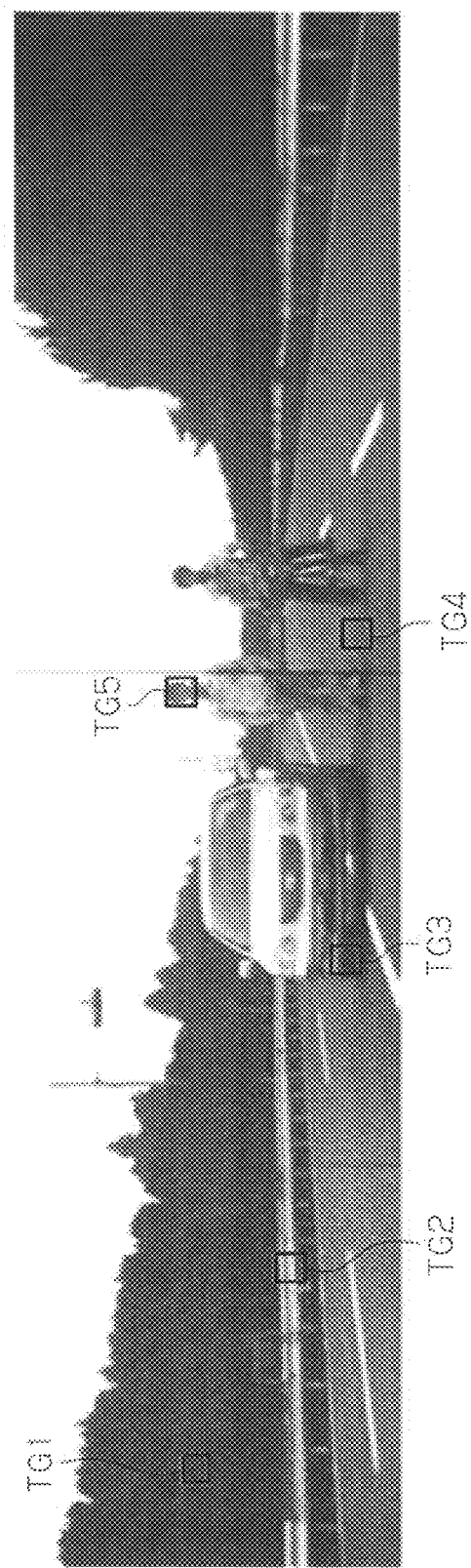
FIG. 4 is a diagram illustrating examples of objects as measurement targets present in the vicinity of a vehicle.
Figure 5A:
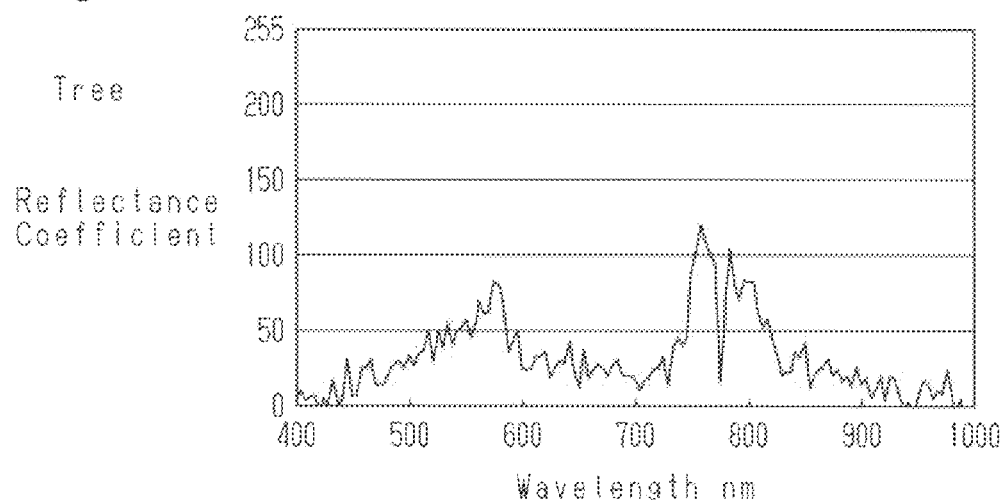
FIGS. 5(a) to 5(c) are graphs showing examples of spectral reflectances specific to respective measurement targets.
Figure 5B:
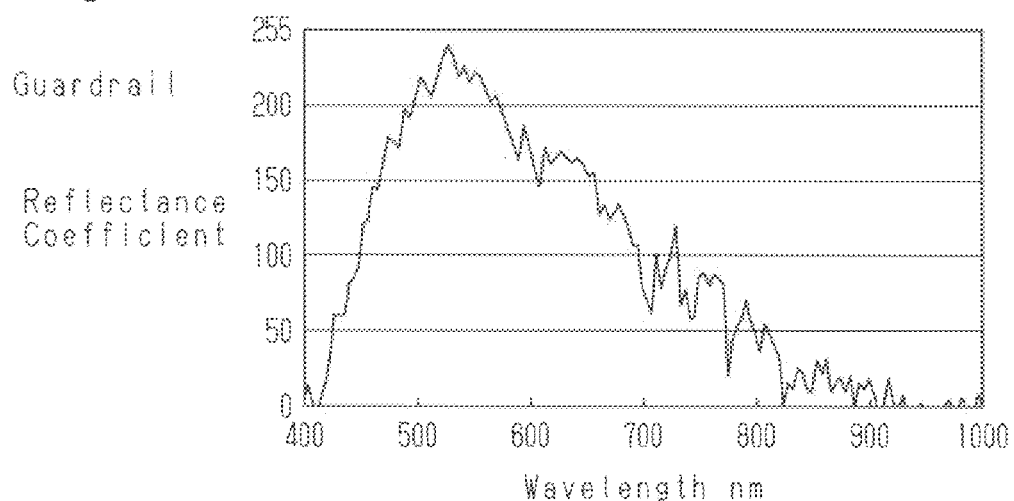
Figure 5C:
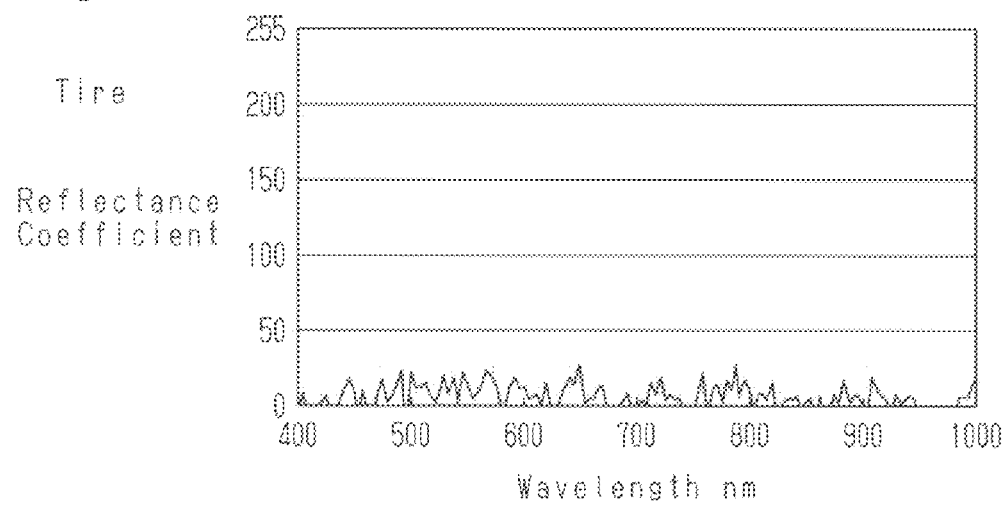
Figure 6A:
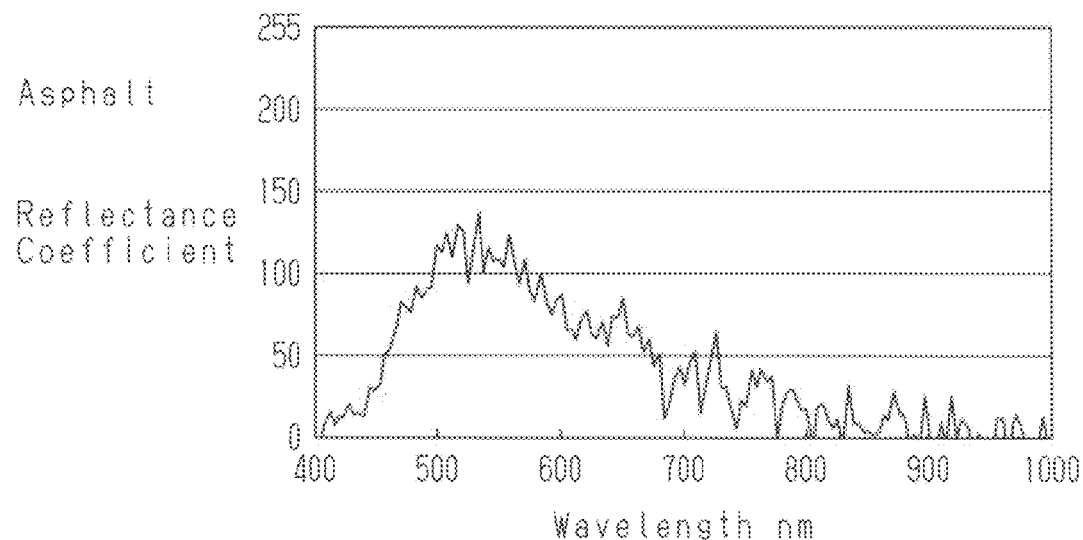
FIGS. 6(a) and 6(b) are graphs showing examples of spectral reflectances specific to respective measurement targets.
Figure 6B:
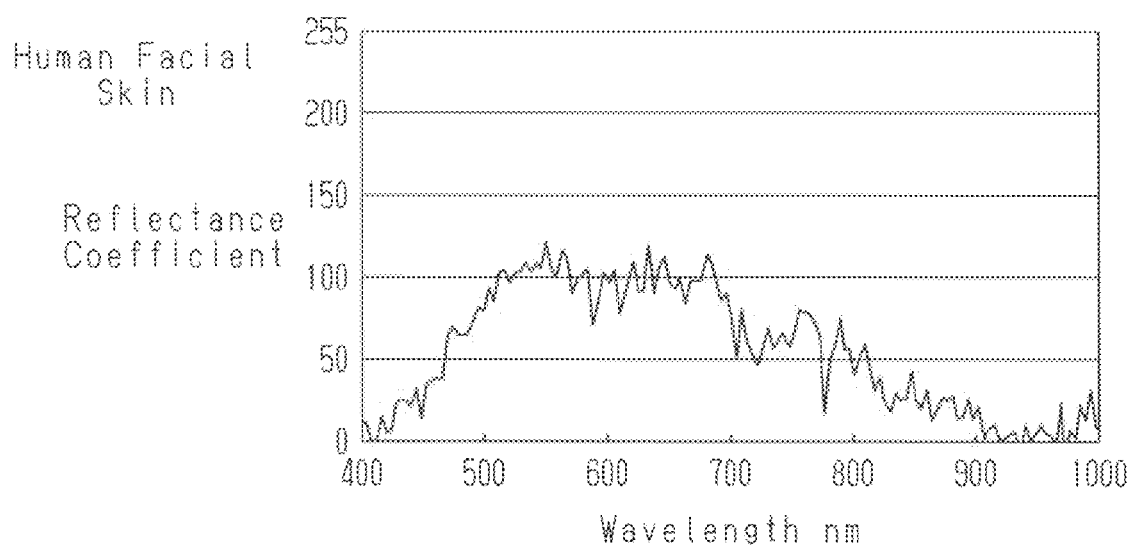

The spectral database 223 includes previously registered sets of spectral data of, for example, "tree TG1", "guardrail TG2", "tire TG3", "asphalt TG4", "human facial skin TG5", etc, as shown in FIG. 4, as objects (measurement targets) that need to be identified for assisting the drive of the vehicle. The spectral data sets of the "tree TG1", "guardrail TG2", "tire TG3", "asphalt TG4", and "human facial skin TG5" are illustrated respectively in FIGS. 5(*a*) to 5(*c*), 6(*a*), and 6(*b*). These spectral data sets indicate the spectral reflectance (more precisely, reflectance coefficients) specific to the respective objects to be measured. Namely, objects to be measured have a specific spectral reflectance in accordance with their physical properties such as their surface contours or the like. Thus, spectral data sets indicative of such spectral reflectances are registered in advance in the spectral database 223 to be used for recognition of the measurement targets. The information indicating spectral data sets on the respective measurement targets are stored in the spectral database 223 in the form of tables representing the reflectance coefficients in 8 bits for each of the wavelengths, for example, as shown in FIG. 7. With the reflectance coefficient represented by value r in 8 bits, the reflectance may preferably be represented as r/255, such as "0" when the value r is "0", and "1.0" when the value r is "255".

The type identification unit 222 compares (matches) the spectral data set of the measurement target measured by the spectral sensor S with the spectral data sets of various objects registered in the spectral database 223 by a normalized cross correlation method, for example. The type identification unit 222 compares the spectral data sets to identify the measurement target measured by the spectral sensor S as one of a "human being", or a "vehicle", for example. Once the type of the measurement target is identified by the type identification unit 222, information indicating the type of the measurement target is output to a reflectance search unit 224 that determines a reflectance specific to the measurement target. The reflectance search unit 224 looks up reflectances of measurement targets registered in the spectral database 223 and obtains a reflectance "R" of the measurement target in question based on the identification result of the type of the measurement target input from the type identification unit 222. The reflectance "R" of the measurement target thus obtained based on the spectral data set of a wavelength band exhibiting a low atmospheric absorption coefficient is output to a distance calculation unit 240 that calculates the distance from the vehicle to the measurement target. Objects (such as a human being or vehicle) can be extracted from the measurement target by any of the commonly known image recognition techniques. As these techniques are well known, they will not be described in detail.

Meanwhile, spectral data on the measurement targets stored in the data storage memory 210 is also received by a reflection intensity (received light intensity) calculation unit 230 that calculates the intensity of reflected light from the measurement target irradiated by the lighting device 100. The reflection intensity calculation unit 230 outputs the received spectral data set of the measurement target to a second band limiting unit 231, which extracts only part of the spectral data set of a wavelength band that is more affected by atmospheric absorption caused by $H_2O$, $CO_2$ or the like, i.e., one of the wavelength bands around 0.93 μm, 1.1 μm, 1.4 μm, and 1.9 μm with a high atmospheric absorption coefficient. The spectral data set of a wavelength band exhibiting a high atmospheric absorption coefficient extracted by the second band limiting unit 231 is received by a reflection intensity obtaining unit 232 that calculates the intensity of reflection light from the measurement target irradiated by the lighting device 100 (received light intensity).

The reflection intensity obtaining unit 232 determines the intensity Pr of reflection light from the measurement target based on the wavelength band exhibiting a high atmospheric absorption coefficient of the spectral data measured by the spectral sensor S. The reflection light intensity Pr determined by the reflection intensity obtaining unit 232 is output to the distance calculation unit 240. The distance calculation unit 240 that receives the input of reflection light intensity Pr also receives light emission output PP of the lighting device 100 from the data storage memory 210.

Once the distance calculation unit 240 receives the light emission output PP of the lighting device 100, the reflectance R of the measurement target, and the intensity Pr of reflection light from the measurement target, it calculates the distance L from the vehicle that is the observation point of the spectral data to the measurement target, through an arithmetic operation using these elements and a correction factor k. The correction factor k is a coefficient indicating the relationship between the output of the lighting device 100 and the intensity of light received by the spectral sensor S when the reflectance R and the distance L are both 1. The correction factor k is used for defining an absolute value of the light output intensity PP of the lighting device 100 and an absolute value of the intensity Pr of observed light detected by the spectral sensor at a predetermined distance. A given value from 0 to 1, for example, is set as the correction factor k.

Thus, a measurement target present in the vicinity of the vehicle is recognized, wherein the measurement target is identified as a human being, or an obstacle such as a guardrail, an animal, or a plant, and the distance "L" from the vehicle to the measurement target is calculated, and the recognition information is output to a drive assist system 300 that performs navigation, cruise control, or otherwise assists the drive. The drive assist system 300 notifies the user of the recognition information of the measurement target present in the vicinity of the vehicle.

Next, the procedure for calculating the distance from the vehicle to the measurement target will be described with reference to FIGS. 8 and 9. Line B shown as a solid line in FIG. 9 indicates a spectral distribution shape of light irradiated from the lighting device 100 to the measurement target. Feature SP1 shown as a broken line represents a spectral distribution shape of human facial skin when no light is irradiated from the lighting device 100. Feature SP2 shown as a solid line represents a spectral distribution shape based on the spectral data obtained by the spectral sensor S when the lighting device 100 is irradiating light.

Suppose that there is a human being as a measurement target in the vicinity of the vehicle while the vehicle is running. When the lighting device 100 irradiates light B to the measurement target at step S100 in a manner shown in FIG. 9, a sensor control value that determines the light receiving sensitivity of the spectral sensor S is set (step S101).

Next, spectral data on the human being as the measurement target irradiated with the light B from the lighting device 100 is obtained by the spectral sensor S (step S102). Thus, a set of spectral data having a distribution shape with the feature SP1 changed to the feature SP2 as shown in FIG. 9 is obtained.

Figure 8:
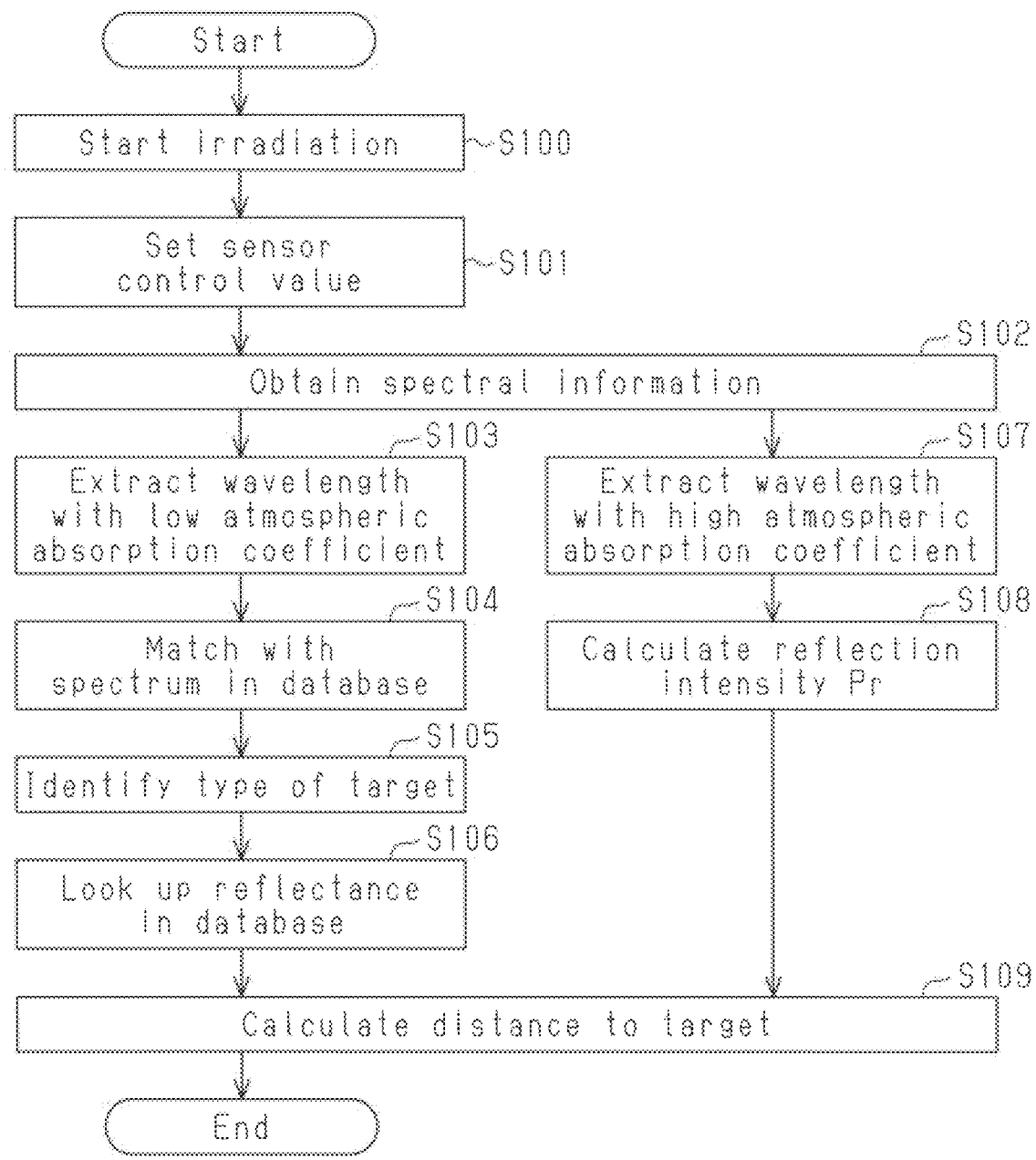
FIG. 8 is a flowchart showing the procedure for recognizing a distance from a vehicle to a measurement target according to the first embodiment.
Figure 9:
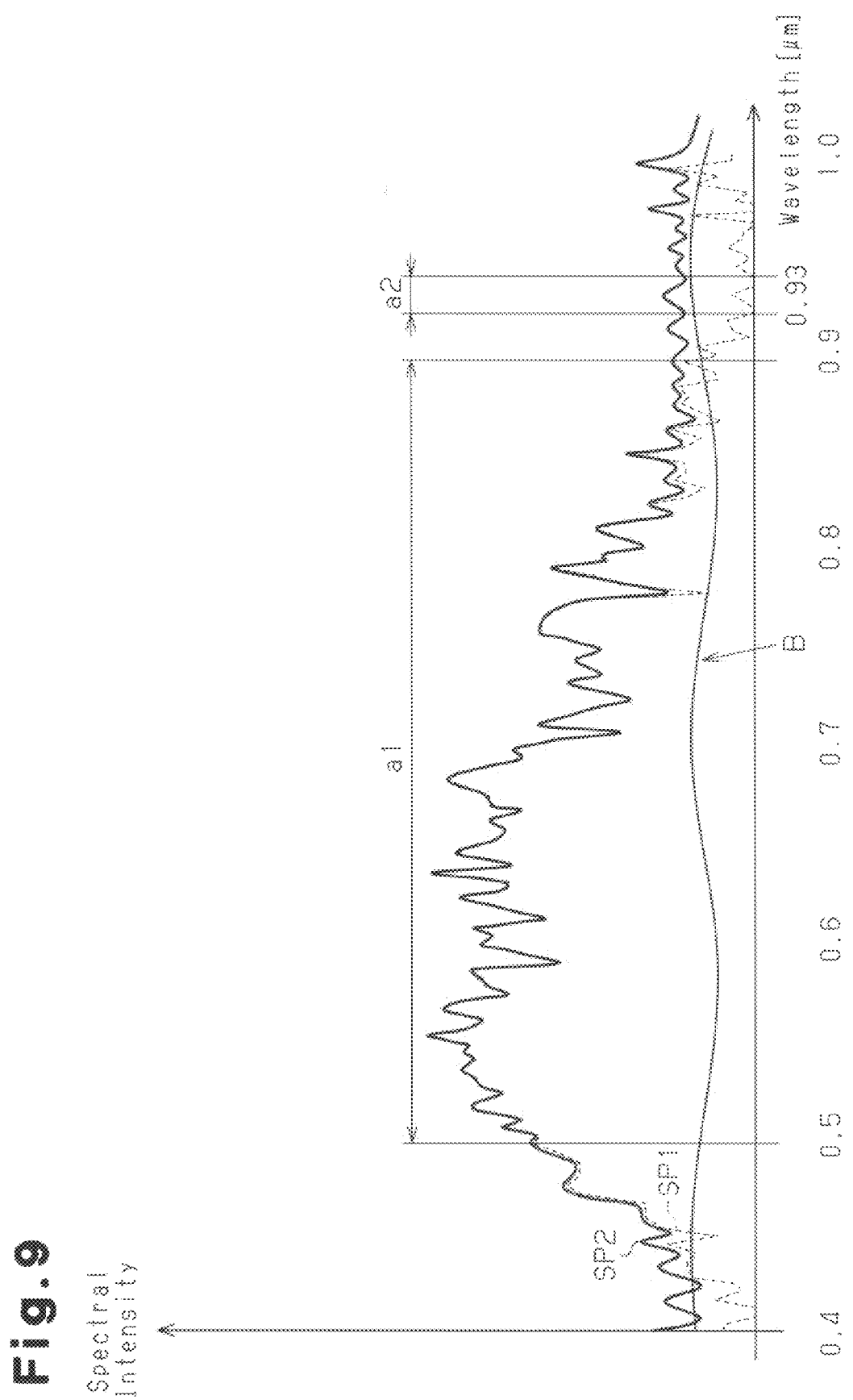
FIG. 9 is a graph showing a spectral distribution shape of human facial skin as one example of a spectral distribution shape of a measurement target measured by a spectral sensor.

Part of spectral data in a wavelength band exhibiting a low atmospheric absorption coefficient indicated as regional in FIG. 9, i.e., from 0.5 μm to 0.8 μm, is extracted from the obtained spectral data (step S103 in FIG. 8). Also, part of the spectral data in a wavelength band exhibiting a high atmospheric absorption coefficient indicated as region a2 in FIG. 9, for example, around 0.93 μm, is extracted (step S107 in FIG. 8). In this example, the spectral data on the wavelength band around 0.93 μm is used as the wavelength band exhibiting a high atmospheric absorption coefficient, in consideration of the light receiving characteristics of the spectral sensor S.

Of these extracted spectral data sets, the spectral data set of the regional with a low atmospheric absorption coefficient is compared first with the plurality of spectral data sets registered in the spectral database 223 to identify the measurement target (steps S103 and S104). Through comparison of the spectral data sets, the type of the measurement target corresponding to the obtained spectral data is identified as "human being", and the reflectance "Re" of this "human being" is determined (steps S105 and S106).

Of the extracted spectral data sets, the spectral data set of the region a2 with a high atmospheric absorption coefficient is used to determine the reflection intensity Pr of light irradiated by the lighting device 100 and reflected by the "human being" as the measurement target with the reflectance Re (steps S107 and S108).

Once the reflectance Re of the "human being" as the measurement target and the reflection intensity Pr based on the reflectance Re are calculated, the distance L from the "human being" as the measurement target to the vehicle that is the observation point of the spectral data is calculated using the following expression (1) (Step S109).

$$L^4 = (PP/Pr) \times R \times k \quad (1)$$

$$R = Re$$

In this way, the measurement target is recognized, wherein the distance from the vehicle to the measurement target is calculated, with reduced influence of sunlight as ambient light.

This embodiment provides the following advantages.

(1) The distance from the measurement target present in the vicinity of the vehicle to the vehicle is calculated using spectral data on light observed from the measurement target irradiated with light including a wavelength band exhibiting a high atmospheric absorption coefficient. This allows for recognition of the distance from the measurement target to the vehicle based on the spectral data on the wavelength band exhibiting reduced influence of sunlight, and identification of this measurement target at the same time. Moreover, there is no need to perform any calculation for correction such as removing the influence of ambient light from the observed spectral data, so that the load for recognizing the measurement target is reduced, and the processing for the recognition of the measurement target can be made at higher speed.

(2) The lighting device 100 is configured to be capable of irradiating light of both wavelength bands having a high atmospheric absorption coefficient and a low atmospheric absorption coefficient. While the measurement target is identified based on the spectral data on the measurement target irradiated with light of the wavelength band exhibiting a low atmospheric absorption coefficient, the reflection intensity Pr is determined based on the spectral data on the measurement target irradiated with light of the wavelength band exhibiting a high atmospheric absorption coefficient. This enables highly accurate identification of the measurement target based on spectral data with small influence of atmospheric absorption, as well as highly accurate recognition of the distance "L" based on spectral data with small influence of ambient light.

(3) In identifying the measurement target, spectral data from 0.5 μm to 0.8 μm having a particularly low atmospheric absorption coefficient is used as the spectral data on a wavelength band other than the wavelength band exhibiting a high atmospheric absorption coefficient. This enables identification of the measurement target based on spectral data on a wavelength band exhibiting very small influence of atmospheric absorption on the spectral data reflecting the properties specific to each measurement target.

(4) The distance from the vehicle to the measurement target is recognized through an arithmetic operation using the expression (1). Thus the distance from the vehicle to the measurement target can be easily determined using the elements such as the reflectance R, received light intensity Pr, and light emission output PP.

(5) The spectral sensor S and the lighting device 100 are both mounted on a vehicle, so that objects such as people, guardrails, animals, or plants in the vicinity of the vehicle are recognized as measurement targets. This enables correct identification of objects present in the vicinity of the vehicle, wherein the types of objects are identified, as well as recognition of relative distance from the vehicle to a human being present in the vicinity of the vehicle, or another vehicle in front, with minimum influence of ambient light. Thus various recognition information necessary for assisting the drive of the vehicle mentioned above can be obtained correctly with minimum influence of ambient light.

A spectrum measurement device according to a second embodiment of the present invention will be hereinafter described with reference to FIGS. 10 to 12. While the basic configuration is common to the first embodiment, as the recognition of a measurement target, the approaching condition of the measurement target present in the vicinity of the vehicle is determined in this embodiment.

Figure 10:
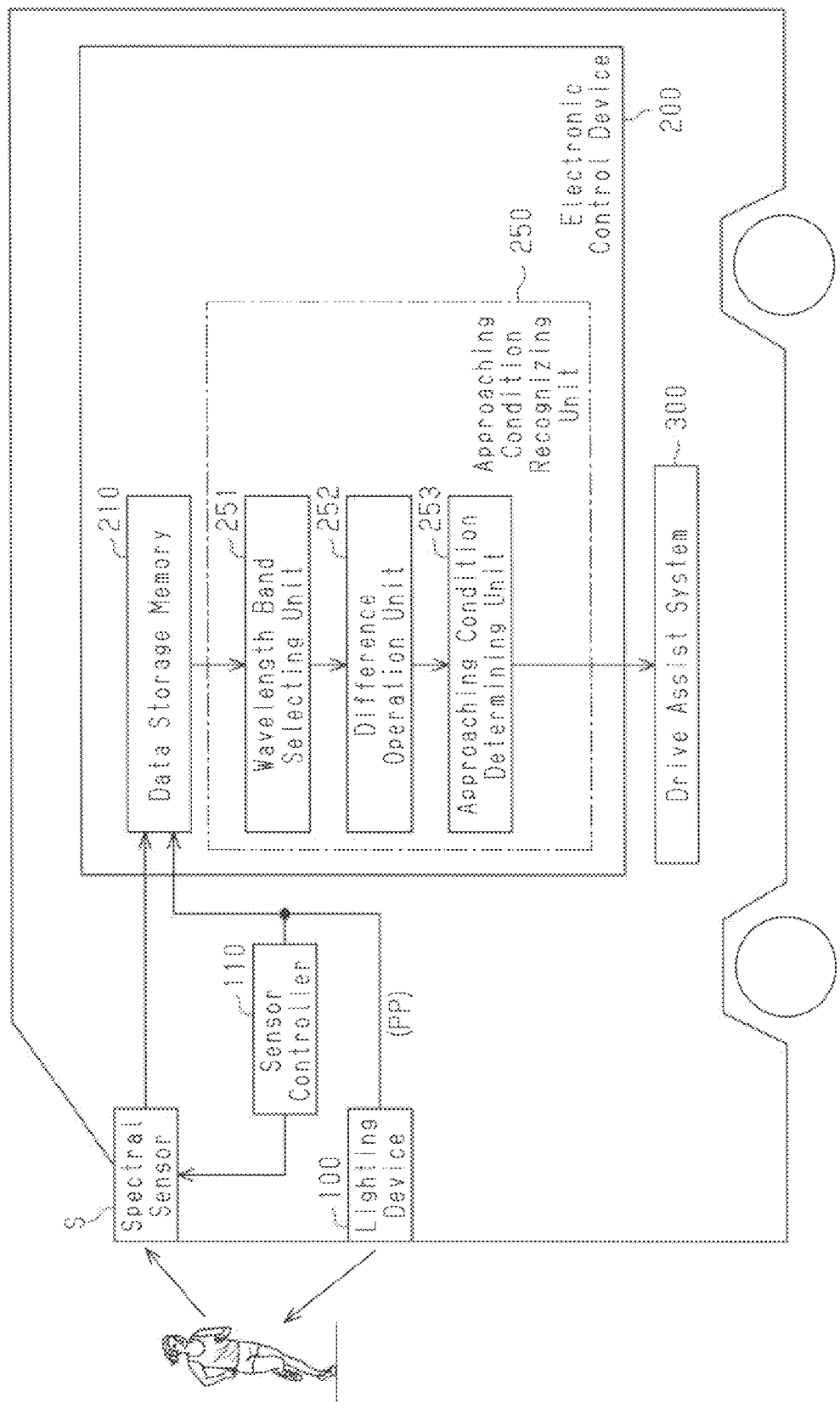
FIG. 10 is a block diagram illustrating the schematic configuration of a spectrum measurement device according to a second embodiment of the present invention.
Figure 11:
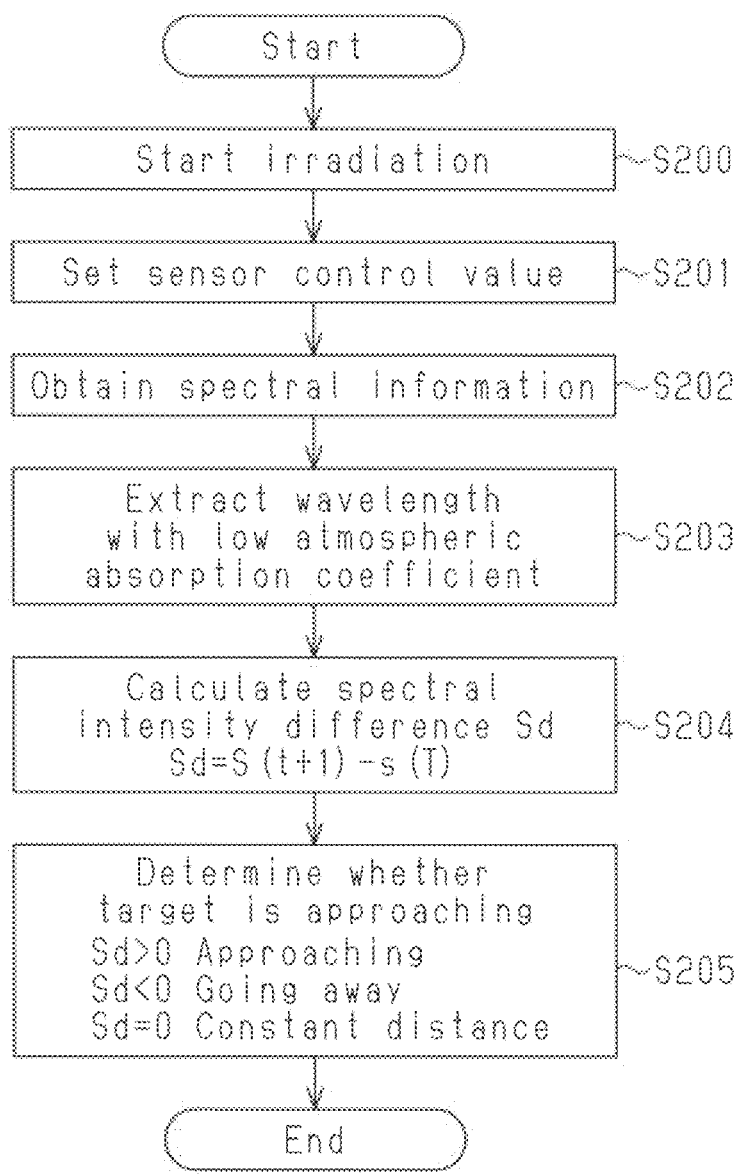
FIG. 11 is a flowchart showing the procedure for recognizing a change in relative distance to a measurement target.

Suppose that spectral data on a measurement target is measured by the spectral sensor S as shown in FIG. 10. This spectral data is progressively stored in the data storage memory 210 of the electronic control device 200. The spectral data progressively stored in the data storage memory 210 is output to an approaching condition recognizing unit 250 that recognizes an approaching condition of the measurement target, from which the spectral data was obtained, to the vehicle. The spectral data received by the approaching condition recognizing unit 250 is then received by a wavelength band selecting unit 251 that selects and extracts part of spectral data in a wavelength band exhibiting a high atmospheric absorption coefficient from this spectral data. The wavelength band selecting unit 251 extracts part of spectral data in wavelength bands around 0.93 μm, 1.1 μm, 1.4 μm, and 1.9 μm, for example, as spectral data on a wavelength band exhibiting a high atmospheric absorption coefficient. The spectral data on wavelength bands with a high atmospheric absorption coefficient thus extracted by the wavelength band selecting unit 251 is then received by a difference operation unit 252 that determines changes over time of the spectral data. The difference operation unit 252 performs difference operation on the spectral data set of the same measurement target obtained at various different points in time, as spectral data is constantly measured by the spectral sensor S and progressively stored in the data storage memory 210.

The difference value calculated through the difference operation is output to an approaching condition determining unit 253 that recognizes the approaching condition of the measurement target relative to the vehicle based on the changes over time of the spectral data on the measurement target. Based on the difference value of the spectral data on the measurement target, the approaching condition determining unit 253 recognizes if the measurement target is
a. approaching,
b. going away from, or
c. staying a constant distance away from the vehicle. Once the approaching condition of the measurement target is recognized by the approaching condition determining unit 253, the recognized information is output to the drive assist system 300, so that the user is notified of presence or absence of approaching objects in the vicinity of the vehicle such as a human being, a vehicle in front, or an animal.

Figure 12A:
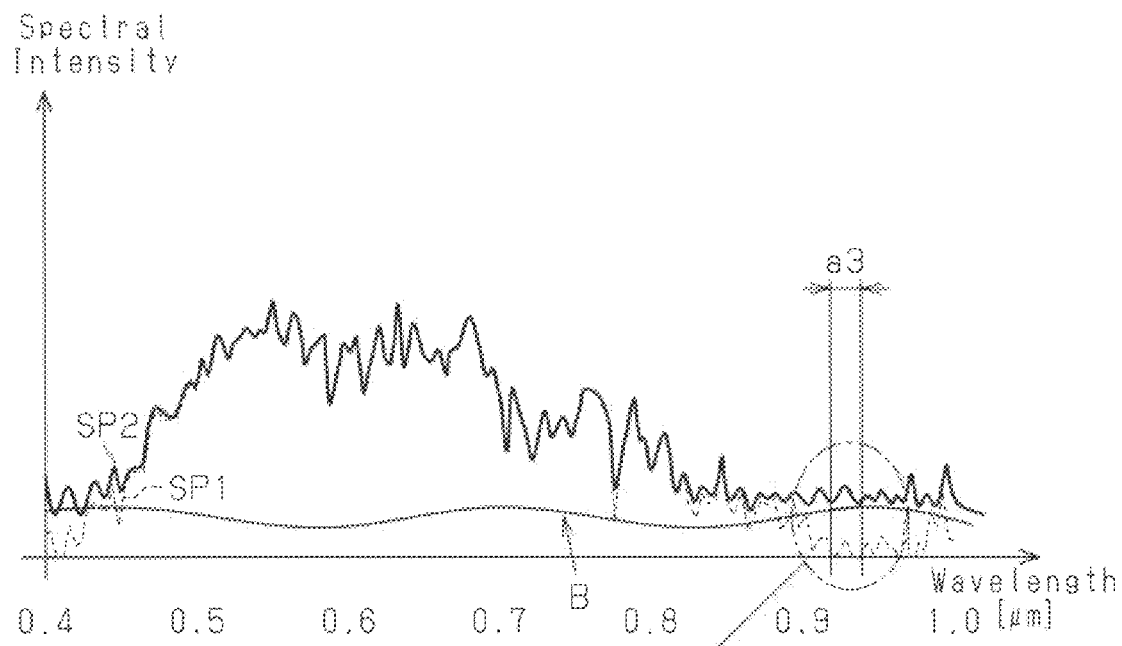
FIG. 12(a) is a graph showing a spectral distribution shape of human facial skin as one example of a spectral distribution shape obtained by a spectral sensor.

Next, the procedure for recognizing the measurement target will be described with reference to FIGS. 11 and 12. FIG. 11 shows the calculation procedure for determining the approaching condition of the measurement target. FIGS. 12(a) and 12(b) show examples of changes of the spectral data on the measurement target measured by the spectral sensor S. Line B shown as a solid line in FIG. 12(a) indicates light irradiated from the lighting device 100 to the measurement target. Feature SP1 shown as a broken line in FIG. 12(a) represents a spectral distribution shape of human facial skin when no light is irradiated from the lighting device 100. Feature SP2 shown as a solid line represents spectral data (spectral distribution shape) obtained by the spectral sensor S when the lighting device 100 is irradiating light.

Suppose that there is a human being as a measurement target in the vicinity of the vehicle while the vehicle is running. When the lighting device 100 irradiates light B to the measurement target at step S200 in a manner shown in FIG. 12(a), a sensor control value that determines the light receiving sensitivity of the spectral sensor S is set (step S201 in FIG. 11).

Next, spectral data on the human being as the measurement target irradiated with the light from the lighting device 100 is obtained at different points in time by the spectral sensor S (step S202). Thus, a set o spectral data having a distribution shape with the feature SP1 changed to the feature SP2 as shown in FIG. 12(a) is obtained.

From the respective spectral data sets obtained at different points in time, part of the spectral data set of a wavelength band around 0.93 μm indicated as region a3, for example, is selected and extracted as spectral data set of a wavelength band exhibiting a high atmospheric absorption coefficient (step S203). Next, difference values of the respective spectral data sets obtained at different points in time are calculated (step S204).

Figure 12B:
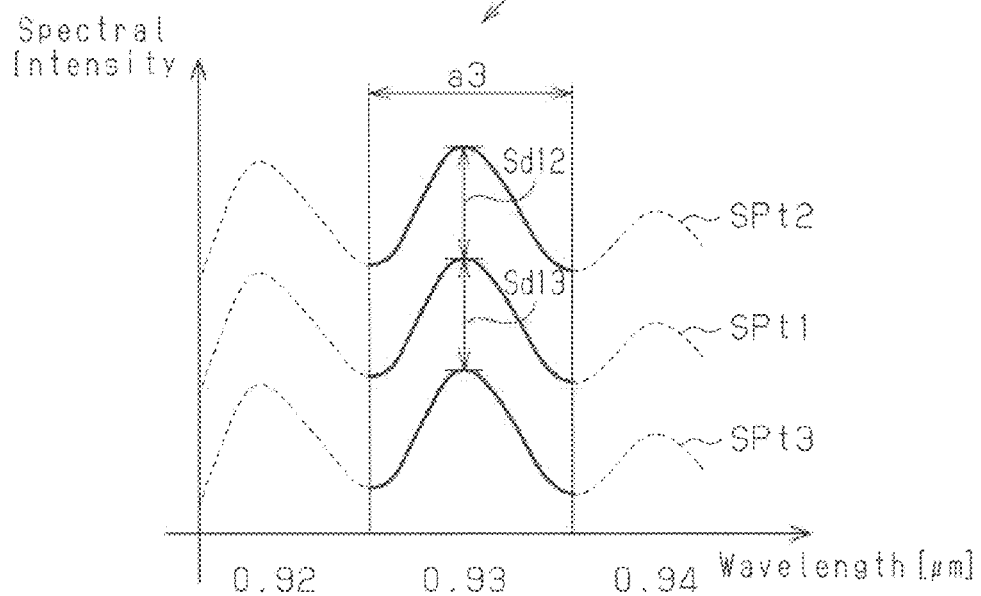
FIG. 12(b) is a graph showing an example of changes of measured spectral data on the example above between one point in time and another point in time.

That is, if the measurement target is approaching the vehicle from point in time t to point in time t+1, the spectral feature of the same measurement target changes from SPt1 at point in time t to SPt2 at point in time t+1 as shown in FIG. 12(b), which indicates an increase in spectral intensity of the measurement target measured by the spectral sensor S. The difference in spectral intensity here between the spectral features SPt1 and SPt2 is "Sd12". On the other hand, if the measurement target is going away from the vehicle from point in time t to point in time t+1, the spectral feature of the same measurement target changes from SPt1 at point in time t to SPt3 at point in time t+1, which indicates a decrease in spectral intensity of the measurement target measured by the spectral sensor S. The difference in spectral intensity between the spectral features SPt1 and SPt3 is Sd13. This decrease results from the light projected from the lighting device 100 losing its intensity as it passes through the atmosphere with a predetermined attenuation factor, i.e., it is caused by the light projected from the lighting device 100 and reflected by the measurement target changing its intensity as the distance between the vehicle and the measurement target decreases, or increases. If the relative distance from the measurement target to the vehicle is constant, the spectral intensity of the measurement target will remain the same at different points in time.

In this embodiment, the spectral intensity difference Sd that indicates a change over time in spectral data set is calculated by the following expression (2) at step S204, where S and S+1 respectively represent the spectral intensity of spectral data set obtained and extracted at different points in time t and t+1.

$$Sd = S(t+1) - S(t). \tag{2}$$

The approaching condition of the measurement target relative to the vehicle is determined based on the spectral intensity difference Sd thus obtained (step S204). It is determined that the measurement target is approaching the vehicle if the spectral intensity difference Sd exceeds 0, and that the measurement target is going away from the vehicle if the spectral intensity difference Sd is less than 0. If the spectral intensity difference Sd is 0, it is determined that the relative distance from the measurement target to the vehicle is constant.

This embodiment provides the following advantages.

(6) The approaching condition of a measurement target is recognized through an arithmetic operation for determining a change over time of the spectral data on the measurement target irradiated with light of a wavelength band exhibiting a high atmospheric absorption coefficient. This enables highly accurate recognition of a measurement target based on spectral data with reduced influence of ambient light, when recognizing the approaching condition of the measurement target to the vehicle based on a change over time of spectral data that takes place in accordance with the positional relationship (distance) between the vehicle and the measurement target.

(7) Ambient light (sunlight) contains only a very small wavelength band having such a high atmospheric absorption coefficient, i.e., light that is much absorbed by the atmosphere. Therefore, even a light projector having lower energy than sunlight can easily pick up a spectral intensity difference. Thus low energy measurement can be realized.

(8) Changes over time of spectral data are determined through difference operation on spectral data obtained at various different points in time. This enables recognition of the approaching condition of a measurement target as changes in spectral intensity, which take place in correlation with the distance between the vehicle and the measurement target.

(9) As the changes over time of spectral data are determined through difference operation on spectral data obtained at various different points in time, it is possible to recognize the approaching condition of a measurement target based on a simple determination such as whether the spectral intensity has increased or decreased.

The following changes may be made to the embodiments described above.

In the second embodiment described above, changes over time of spectral data are determined through difference operation on spectral data obtained at various different points in time. Alternatively, the changes over time of spectral data may be determined through division operation on spectral data obtained at various different points in time. In this case, the quotient Sw, which indicates a change over time in spectral data, is calculated by the following expression (3), where S and S+1 respectively represent the spectral intensity of spectral data obtained and extracted at different points in time t and t+1.

$$Sw = S(t+1)/S(t). \qquad (3)$$

It is then determined that the measurement target is approaching the vehicle if the quotient Sw exceeds "1", and that the measurement target is going away from the vehicle if the quotient Sw is less than 1. If the quotient Sw is 1, it is determined that the relative distance from the measurement target to the vehicle is constant.

Figure 13:
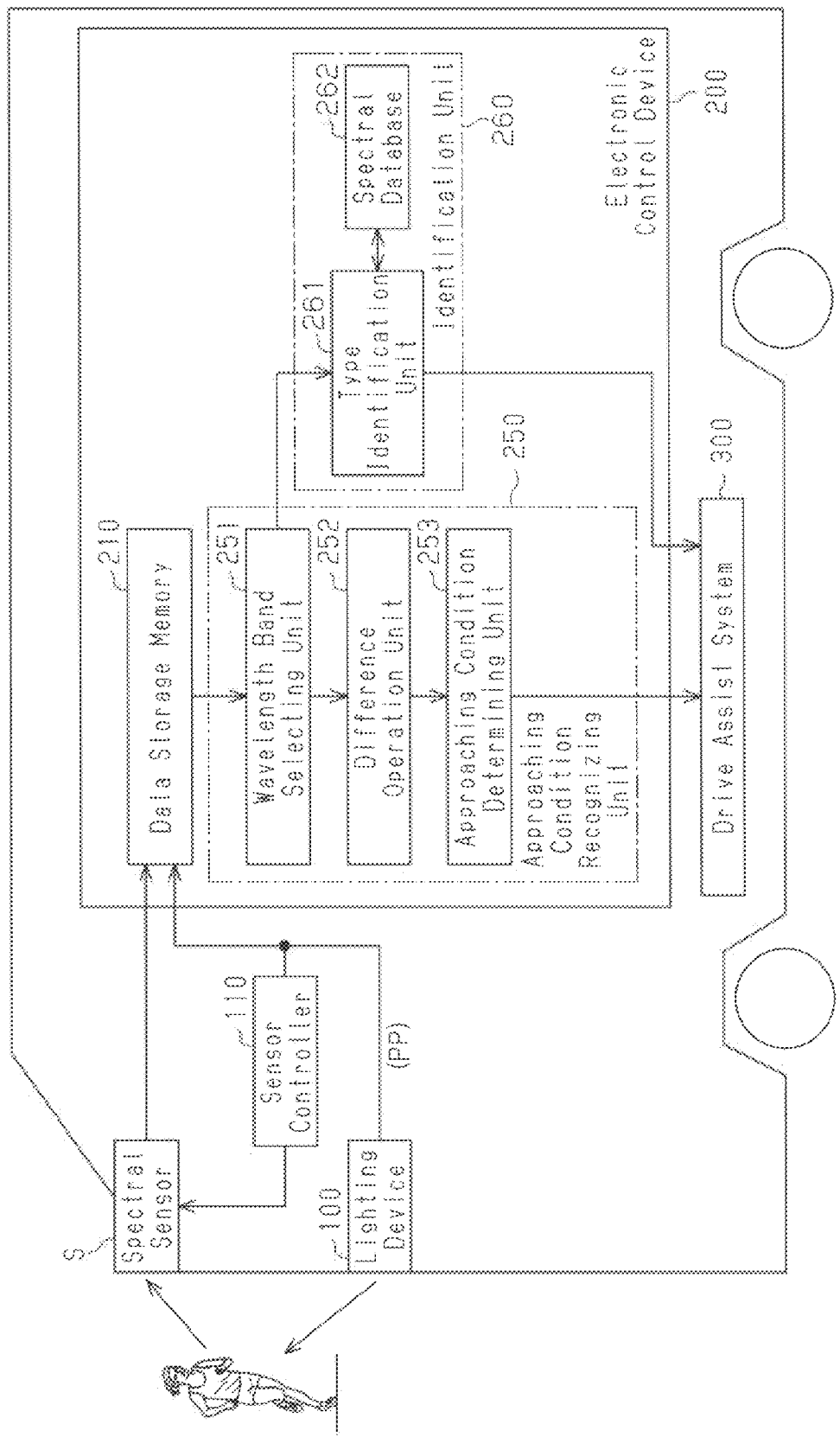
FIG. 13 is a block diagram illustrating the schematic configuration of a spectrum measurement device according to another embodiment of the present invention.

In the second embodiment described above, as the recognition of a measurement target, only the approaching condition of an object present in the vicinity of the vehicle is recognized. Alternatively, this recognition of the approaching condition of the measurement target may be accompanied by identification of the measurement target. Namely, the spectrum measurement device may be configured as shown in FIG. 13 to further include an identification unit 260 that recognizes (identifies) a measurement target present in the vicinity of the vehicle as what it is, i.e., which one of objects such as a human being, a guardrail, an animal, or a plant, in addition to the configuration of FIG. 10. The measurement target may be identified by looking up the spectral database 262 where sets of spectral data on a plurality of measurement targets are registered, using the spectral data on a wavelength band exhibiting a high atmospheric absorption coefficient extracted by the wavelength band selecting unit 251 and received by the type identification unit 261. Thus the measurement target can be identified, and at the same time the approaching condition of the identified measurement target can be recognized. The spectral data on the measurement target received by the type identification unit 261 may be spectral data on other wavelength bands than that with a high atmospheric absorption coefficient.

In the first embodiment described above, as the recognition of a measurement target, the distance from the vehicle to the measurement target is recognized. Alternatively, the moving speed of the measurement target relative to the vehicle can also be calculated based on changes in distance per unit time from the vehicle to the measurement target, which can be determined based on two sets of spectral data obtained at different points in time. Thereby, as the measurement target present in the vicinity of the vehicle is recognized, the moving speed of the measurement target relative to the vehicle can also be recognized.

In the second embodiment described above, as the recognition of a measurement target, the approaching condition of the measurement target relative to the vehicle is recognized. Alternatively, since the changes in spectral intensity obtained at different points in time also correlate with the moving speed of the measurement target, it can be determined that the larger the changes in spectral intensity per unit time, the higher the speed of the measurement target approaching, or going away from, the vehicle. On the other hand, it can be determined that the smaller the changes in spectral intensity per unit time, the lower the speed of the measurement target approaching, or going away from, the vehicle. Therefore, when the approaching condition of the measurement target is recognized, it can also be determined whether the speed of the measurement target approaching or going away from the vehicle is "high" or "low", through determination of whether or not the amount of change in spectral intensity of the same measurement target between one point in time and another point in time exceeds a predetermined threshold.

In the second embodiment described above, changes over time of spectral data are determined based on changes in spectral intensity. Alternatively, the changes over time of spectral data may be determined based on changes in the distribution shape of the spectral data.

In the first embodiment described above, the measurement target is identified based on spectral data on a wavelength band exhibiting a particularly low atmospheric absorption coefficient, while the intensity Pr of the light reflected by the measurement target is obtained based on spectral data on a wavelength band exhibiting a high atmospheric absorption coefficient. Alternatively, the measurement target can also be identified based on spectral data on other wavelength bands than the wavelength band exhibiting a high atmospheric absorption coefficient. If sufficient spectral data necessary for the identification of the measurement target is measurable, the measurement target may be identified based only on the spectral data on a wavelength band exhibiting a high atmospheric absorption coefficient.

In the embodiments described above, the lighting device 100 constantly irradiates light to the measurement target. Alternatively, in the first embodiment, the lighting device 100 may irradiate light only when recognizing the distance to the measurement target. In the second embodiment, the lighting device 100 may be turned on and off at predetermined intervals, i.e., the lighting device 100 may irradiate light only when measuring spectral data at different points in time. Thus spectral data on the measurement target can be obtained with minimum necessary irradiation of light.

Figure 14:
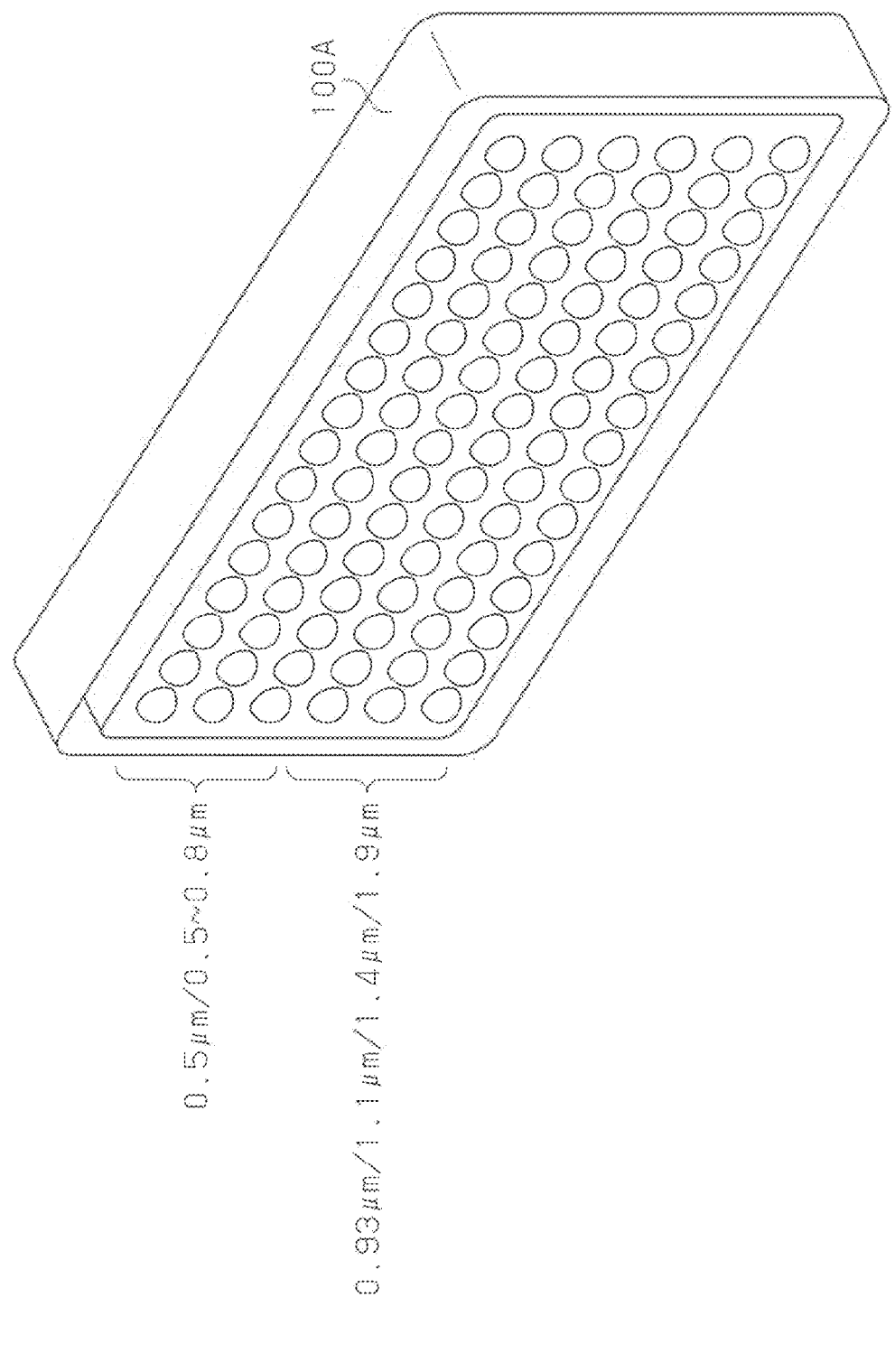
FIG. 14 is a perspective view illustrating the schematic configuration of a lighting device employed in a spectrum measurement device according to another embodiment of the present invention.
Figure 15A:
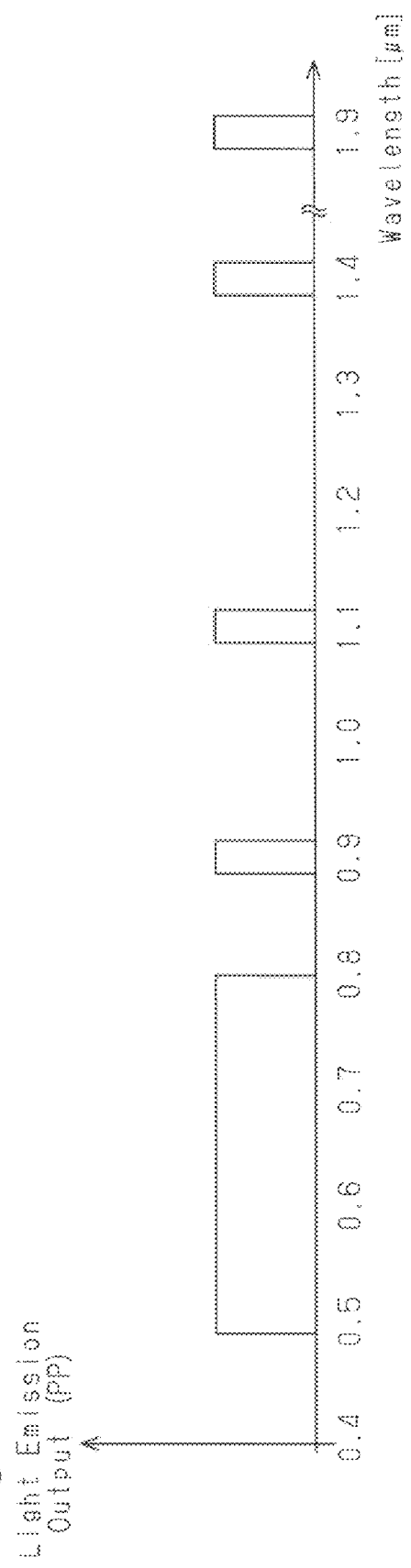
FIGS. 15(a) and 15(b) are graphs showing one example of wavelength-output characteristics of light irradiated from the lighting device in the spectrum measurement device according to another embodiment of the present invention.
Figure 15B:
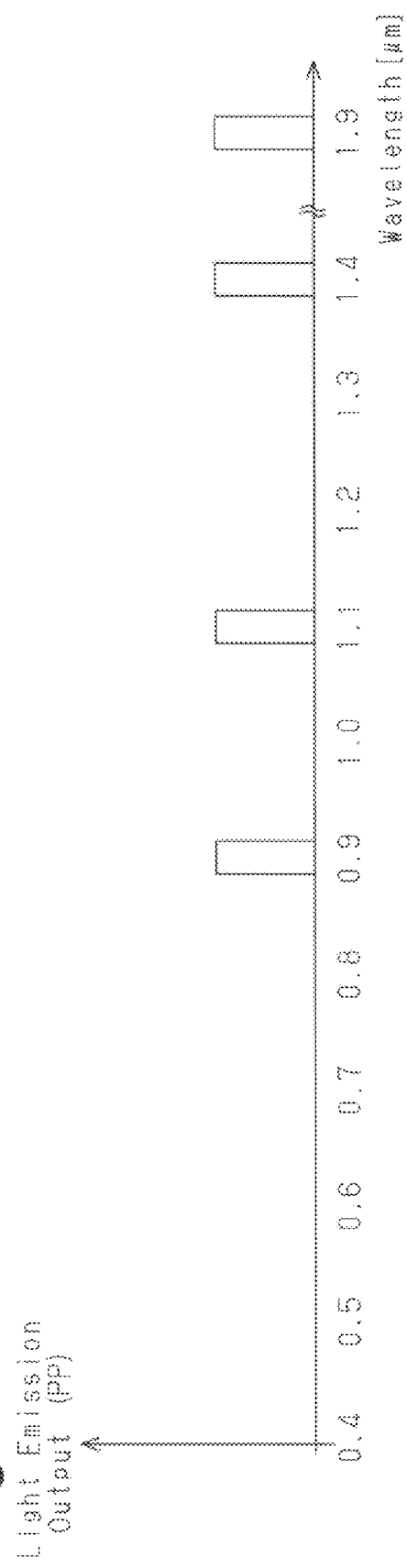

In the embodiments described above, the lighting device 100 is configured to be capable of irradiating light of both wavelength bands having a high atmospheric absorption coefficient and a low atmospheric absorption coefficient. Alternatively, for the lighting device 100, as shown in FIG. 14, for example, a lighting device 100A having an LED unit as a light source configured with a plurality of LED elements in a matrix arrangement emitting light of different wavelengths may be used. More specifically, the lighting device 100A includes a group of LED elements having a wavelength of, for example, 0.5 µm only, or a wavelength band of 0.5 µm to 0.8 µm, as a wavelength band exhibiting a low atmospheric absorption coefficient, and a group of LED elements having one of wavelength bands around 0.93 µm, 1.1 µm, 1.4 µm, and 1.9 µm. These LED elements characteristically emit light of short wavelengths, and the wavelength bands are determined by the content of impurities contained in the LED elements. In the first embodiment described above, light of any of the wavelength bands around 0.93 µm, 1.1 µm, 1.4 µm, and 1.9 µm as shown in FIG. 15(a) may be irradiated to the measurement target, as a wavelength band exhibiting a high atmospheric absorption coefficient. Light of a wavelength band of 0.5 µm to 0.8 µm may be irradiated to the measurement target as a wavelength band exhibiting a low atmospheric absorption coefficient. In the second embodiment described above, the measurement target may be irradiated only with light of any of the wavelength bands around 0.93 µm, 1.1 µm, 1.4 µm, and 1.9 µm, as shown in FIG. 15(b), as a wavelength band exhibiting a high atmospheric absorption coefficient. With the use of such a lighting device, necessary and sufficient light of wavelength bands with a high atmospheric absorption coefficient and with a low atmospheric absorption coefficient can be irradiated to the measurement target. This means that the lighting device can have higher light intensity output with the same electrical power consumed, and that the influence of ambient light on spectral data measured by the spectral sensor S can be reduced even more. Power consumption of the lighting device can also be reduced with the use of such a lighting device.

In the embodiments described above, the spectral sensor S and the lighting device are both mounted on a vehicle, so that objects in the vicinity of the vehicle are recognized as measurement targets. Alternatively, the spectral sensor S and the lighting device may be configured as a single spectrum measurement device so that objects present in the vicinity of this device are recognized. The measurement target need not be limited to people, animals, or plants. The present invention can be applied to any objects as long as their spectral data can be measured with the spectral sensor S.

In the embodiments described above, sunlight is mentioned as an example of ambient light that has influence on spectral data measured by the spectral sensor S. Ambient light need not be limited to sunlight and may be any light that has a characteristic of reducing energy per unit area irradiated to the measurement target in a wavelength band exhibiting a high atmospheric absorption coefficient.

DESCRIPTION OF THE REFERENCE NUMERALS 100, 100A: lighting device, 110: sensor controller, 200: electronic control device, 210: data storage memory, 220: identification unit, 221: first band limiting unit, 222: type identification unit, 223: spectral database, 224: reflectance search unit, 230: reflection intensity calculation unit, 231: second band limiting unit, 232: reflection intensity obtaining unit, 240: distance calculation unit, 250: approaching condition recognizing unit, 251: wavelength band selecting unit, 252: difference operation unit, 253: approaching condition determining unit, 260: identification unit, 261: type identification unit, 262: spectral database, 300: drive assist system, S: spectral sensor.

The invention claimed is:

1. A spectrum measurement device for recognizing a measurement target based on a spectral data set of observed light detected by a spectral sensor capable of obtaining wavelength information and light intensity information, the spectrum measurement device comprising:
    a lighting device on the spectrum measurement device irradiating light to the measurement target including light in a first wavelength band and light in a second wavelength band, the first wavelength band exhibiting a higher atmospheric absorption coefficient than that of the second wavelength band; and
    circuitry configured to calculate a distance to the measurement target through an arithmetic operation using the spectral data set of observed light from the measurement target irradiated at least with the light in the first wavelength band exhibiting the higher atmospheric absorption coefficient and without removing an influence of ambient light from the spectral data set of observed light, and the circuitry is configured to identify the measurement target using the spectral data set of observed light from the measurement target irradiated with light in the second wavelength band.

2. The spectrum measurement device according to claim 1, wherein
    the circuitry is configured to determine a reflectance specific to the identified measurement target, and
    the circuitry is configured to calculate the distance from an observation point of the spectral data set to the measurement target as a ratio of light output intensity of the lighting device based on the determined reflectance to light intensity of observed light detected by the spectral sensor.

3. The spectrum measurement device according to claim 2, wherein
    the circuitry is configured to access a database having previously registered spectral data sets indicating spectral reflectances of a plurality of measurement targets, the circuitry is configured to identify the measurement target through comparison of the spectral data set of the observed light by the spectral sensor when the measurement target is irradiated with the light in the second wavelength band with the plurality of spectral data sets registered in the database, and to determine the reflectance specific to the measurement target, and
    the light intensity of the observed light detected by the spectral sensor is a value obtained as intensity of light reflected by the measurement target when the light in the first wavelength band exhibiting the higher atmospheric absorption coefficient is being irradiated to the measurement target.

4. The spectrum measurement device according to claim 3, wherein the circuitry is configured to calculate the distance (L) from the observation point of the spectral data set to the measurement target using the following expression $$L^4=(PP/Pr)\times R\times k,$$

where R represents the reflectance determined by the circuitry, PP represents the light output intensity of the lighting device, Pr represents the light intensity of the observed light detected by the spectral sensor, and k represents a correction factor indicating a relationship between the light output intensity PP and the light intensity Pr.

5. The spectrum measurement device according to claim 1, wherein the circuitry is configured to recognize a change in relative distance between the observation point of the spectral data set and the measurement target through an arithmetic operation for determining a change over time of the spectral data set of the observed light from the measurement target irradiated with the light in the first wavelength band exhibiting the higher atmospheric absorption coefficient.

6. The spectrum measurement device according to claim 5, wherein the arithmetic operation for determining a change over time of the spectral data set is either a difference operation or a division operation on spectral data sets obtained at different points in time.

7. The spectrum measurement device according to claim 5, wherein the circuitry is configured to identify the measurement target based on the spectral data set of the observed light detected by the spectral sensor.

8. The spectrum measurement device according to claim 7, wherein when the measurement target is being irradiated with the light in the first wavelength band exhibiting the higher atmospheric absorption coefficient, the circuitry is configured to identify the measurement target irradiated with the light based on a comparison between the spectral data set of the observed light detected by the spectral sensor and the spectral data sets on a plurality of measurement targets previously registered in a database.

9. The spectrum measurement device according to claim 1, wherein
    the spectral sensor and the lighting device are both mounted on a vehicle, and
    the measurement target to be recognized is an object present in the vicinity of the vehicle.

10. The spectrum measurement device according to claim 2, wherein
    the circuitry is configured to identify the measurement target based on the spectral data set of the observed light by the spectral sensor when the measurement target is irradiated with the light in the second wavelength band, and to determine the reflectance specific to the measurement target, and
    the light intensity of the observed light detected by the spectral sensor is a value obtained as intensity of light reflected by the measurement target when the light in the first wavelength band exhibiting the higher atmospheric absorption coefficient is being irradiated to the measurement target.

11. The spectrum measurement device according to claim 10, wherein the circuitry is configured to calculate the distance (L) from the observation point of the spectral data set to the measurement target using the following expression $$L^4 = (PP/Pr) \times R \times k,$$

where R represents the reflectance determined by the circuitry, PP represents the light output intensity of the lighting device, Pr represents the light intensity of the observed light detected by the spectral sensor, and k represents a correction factor indicating a relationship between the light output intensity PP and the light intensity Pr.

12. A spectrum measurement device for recognizing a measurement target based on a spectral data set of observed light detected by a spectral sensor capable of obtaining wavelength information and light intensity information, the spectrum measurement device comprising:
    a lighting device irradiating light to the measurement target including light in a first wavelength band and light in a second wavelength band, the first wavelength band exhibiting a higher atmospheric absorption coefficient than that of the second wavelength band; and
    circuitry configured to calculate a distance to the measurement target through an arithmetic operation using the spectral data set of observed light from the measurement target irradiated at least with the light in the first wavelength band exhibiting the higher atmospheric absorption coefficient, and
    the circuitry is configured to calculate the distance (L) from an observation point of the spectral data set to the measurement target using the following expression $$L^4 = (PP/Pr) \times R \times k,$$

where R represents a reflectance determined by the circuitry, PP represents a light output intensity of the lighting device, Pr represents a light intensity of the observed light detected by the spectral sensor, and k represents a correction factor indicating a relationship between the light output intensity PP and the light intensity Pr.

13. The spectrum measurement device according to claim 1, wherein the circuitry is configured to calculate the distance to the measurement target and to identify the measurement target at a same time.

14. The spectrum measurement device according to claim 1, wherein the circuitry is configured to calculate the distance to the measurement target through the arithmetic operation using the spectral data set of observed light from the measurement target irradiated only with the light in the first wavelength band exhibiting the higher atmospheric absorption coefficient.

15. The spectrum measurement device according to claim 1, wherein the lighting device includes an LED.

* * * * *